(12) United States Patent
Gao et al.

(10) Patent No.: US 8,073,244 B2
(45) Date of Patent: *Dec. 6, 2011

(54) AUTOMATIC DESIGN OF MORPHOLOGICAL ALGORITHMS FOR MACHINE VISION

(75) Inventors: Xiang Gao, Landsdale, PA (US); Visvanathan Ramesh, Plainsboro, NJ (US); Terrance E. Boult, Monument, CO (US)

(73) Assignee: Siemens Corporation, Iselin, NJ (US)

( * ) Notice: Subject to any disclaimer, the term of this patent is extended or adjusted under 35 U.S.C. 154(b) by 1200 days.

This patent is subject to a terminal disclaimer.

(21) Appl. No.: 11/744,925

(22) Filed: May 7, 2007

(65) Prior Publication Data

US 2009/0226100 A1 Sep. 10, 2009

Related U.S. Application Data

(63) Continuation of application No. 10/339,433, filed on Jan. 9, 2003, now Pat. No. 7,428,337.

(51) Int. Cl.
*G06K 9/62* (2006.01)
(52) U.S. Cl. .................. 382/159; 382/160
(58) Field of Classification Search ............ 382/159, 382/160, 165, 169, 170, 181, 224, 225, 226, 382/227, 228; 700/47, 50; 706/15, 19, 20, 706/22, 41
See application file for complete search history.

(56) References Cited

U.S. PATENT DOCUMENTS

| | | | | |
|---|---|---|---|---|
| 5,142,593 | A * | 8/1992 | Kasano | 382/170 |
| 5,671,294 | A * | 9/1997 | Rogers et al. | 382/228 |
| 5,926,804 | A * | 7/1999 | Tufts et al. | 706/25 |
| 6,546,378 | B1 * | 4/2003 | Cook | 706/12 |
| 6,754,389 | B1 * | 6/2004 | Dimitrova et al. | 382/224 |
| 2001/0043722 | A1 * | 11/2001 | Wildes et al. | 382/107 |
| 2002/0159627 | A1 * | 10/2002 | Schneiderman et al. | 382/154 |

OTHER PUBLICATIONS

Cao, Xi-Ren, "State Aggregation and Discrete-State Markov Chains", I.E.E.E. Decision and Control, 1992, pp. 2080-2085 vol. 2.*

* cited by examiner

*Primary Examiner* — Brian Le
(74) *Attorney, Agent, or Firm* — Donald B. Paschburg; F. Chau & Associates, LLC

(57) ABSTRACT

The present invention provides a technique for automated selection of a parameterized operator sequence to achieve a pattern classification task. A collection of labeled data patterns is input and statistical descriptions of the inputted labeled data patterns are then derived. Classifier performance for each of a plurality of candidate operator/parameter sequences is determined. The optimal classifier performance among the candidate classifier performances is then identified. Performance metric information, including, for example, the selected operator sequence/parameter combination, will be outputted. The operator sequences selected can be chosen from a default set of operators, or may be a user-defined set. The operator sequences may include any morphological operators, such as, erosion, dilation, closing, opening, close-open, and open-close.

13 Claims, 6 Drawing Sheets

System Diagram

State Transition for Closing Operator, Initial condition for Success Runs (Left); Success Run Length Overflow (Right)

State Transition for Closing Operator, Small Lengths

State Transition of Closing Operator, Large Success Run Lengths

Diagram of the State Transition for the Hamming Distance Calculation, after closing.

FIG. 7 Results from each processing step

Experimental results: top two rows show good detections with no false alarms, bottom row shows grilled pattern detected in addition to the plate.

AUTOMATIC DESIGN OF MORPHOLOGICAL ALGORITHMS FOR MACHINE VISION

CROSS REFERENCE TO RELATED APPLICATIONS

This application is a continuation of U.S. application Ser. No. 10/339,433, which claims the benefit of U.S. Provisional Application Ser. No. 60/346,995, filed on Jan. 9, 2002, which are incorporated by reference herein in their entirety.

BACKGROUND OF THE INVENTION

1. Technical Field

The present invention relates to pattern analysis, and more particularly, to a method for automated selection of operators and their parameters to achieve a pattern classification task.

2. Discussion of the Related Art

Mathematical morphology is a framework to extract information from images. Under this framework machine vision problems may be solved by image transformations that employ a sequence of parameterized operators. Pixel neighborhood level feature detection followed by a region level grouping and/or morphological filtering is a typical operation sequence in a variety of video and image analysis systems (e.g., document image analysis, video surveillance and monitoring, machine vision and inspection). However, the robustness of these systems is often questionable because of the use of operator/parameter combinations that are set by trial and error.

SUMMARY OF THE INVENTION

According to an aspect of the invention, there is provided a method for automated selection of a parameterized operator sequence to achieve a pattern classification task. A collection of labeled data patterns is input and statistical descriptions of the inputted labeled data patterns are then derived. Classifier performance for each of a plurality of candidate operator/parameter sequences is determined. Optimal classifier performance among the candidate classifier performances is identified. Performance metric information, including, for example, the selected operator sequence/parameter combination, is outputted. The operator sequences selected can be chosen from a default set of operators, or may be a user-defined set. The operators may include any morphological operators, such as erosion, dilation, closing, opening, close-open, and open-close. The operators may also include operators that map an input Boolean vector to an output Boolean vector. Additionally, the operators can include an operator that is defined as successive applications of a 1D filter in two orthogonal directions.

The collection of data patterns can include various patterns of interest. They can also include patterns of non-interest. The data patterns can include any gray-level data/color data transformed to a binary representation.

The statistical descriptions of the input patterns can be derived using any suitable probability model, such as, for example, a mixture of Hidden Markov Models (HMMs), a Bayesian network etc. A probability model that employs a non-parametric density representation may also be used.

The operator sequences selected can be chosen from a default set of operators, or may be a user-defined set.

The criteria for determining an optimal classifier performance can be defined by a user. The criteria will preferably relate to maximizing expected classifier performance. This may involve, for example, balancing the tradeoff of false alarm errors and miss detection errors.

The step of determining classifier performance may include, for each candidate operator sequence and corresponding parameter values and a description of the output statistic to the measured, and given derived statistical descriptions for the inputted data patterns,
1. Constructing an Embedded Markov Chain that uses the steps:
   a) Constructing a state space,
   b) Building a state-transition graph with associated state-transition probabilities state-transition for the candidate operator sequence, and
   c) Partitioning the state-space.
2. Calculating the distribution of the output statistic using the EMC.

According to another aspect of the invention, a method is provided for determining optimal classifier performance of a plurality of candidate operator sequences and corresponding parameter values. For each candidate operator sequence and corresponding parameter values, the method 1. Constructs an Embedded Markov Chain that uses the steps:
   a) Constructing a state space,
   b) Building a state-transition graph with associated state-transition probabilities state-transition for the candidate operator sequence, and
   c) Partitioning the state-space.
2. Calculating the distribution of the output statistic is using the EMC. An optimal operator sequence and corresponding parameter values will be selected for output.

Numerous applications of the pattern classification framework can be realized, including any pattern analysis or classification task, e.g. document processing, license plate detection, text analysis from video, machine vision (object detection, localization and recognition tasks).

These and other aspects, features and advantages of the present invention will become apparent from the following detailed description of preferred embodiments, which is to be read in connection with the accompanying drawings.

DETAILED DESCRIPTION OF EXEMPLARY EMBODIMENTS

According to the present invention, characterization of a morphological operator sequence may be viewed as the derivation of output image statistics as a function of the input image statistics, operator sequence and its tuning parameters. The difficulty is in defining the statistical models for the input data and the corresponding derivation of the output statistical models. In this invention, the input to the morphological algorithm is viewed as a binary random series. The output is viewed as another binary random series whose statistics (e.g. Hamming distance or run/gap length distributions) are functions of the input statistics.

For each particular morphological operator and its parameters, the corresponding Embeddable Markov Chain (EMC) model is built, and the EMC approach is applied to analyze the performance of the operator. The analyses gives insights about how one could automate the selection of a morphological operator sequence and its parameters to achieve a given error rate. License Plate detection is provided as a case study to illustrate the utility of the invention.

To facilitate a clear understanding of the present invention, illustrative examples are provided herein which describe certain applications of the invention (e.g., license plate detection). However, it is to be appreciated that these illustrations are not meant to limit the scope of the invention, and are provided herein to illustrate certain concepts associated with the invention.

It is also to be understood that the present invention may be implemented in various forms of hardware, software, firmware, special purpose processors, or a combination thereof. Preferably, the present invention is implemented in embedded code as a program tangibly embodied on a program storage device. In addition, various other peripheral devices may be connected to a computer platform such as an additional data storage device and a printing device, as well as various still and video imaging input devices.

Embeddable Markov Chain Approach

Figure 1:
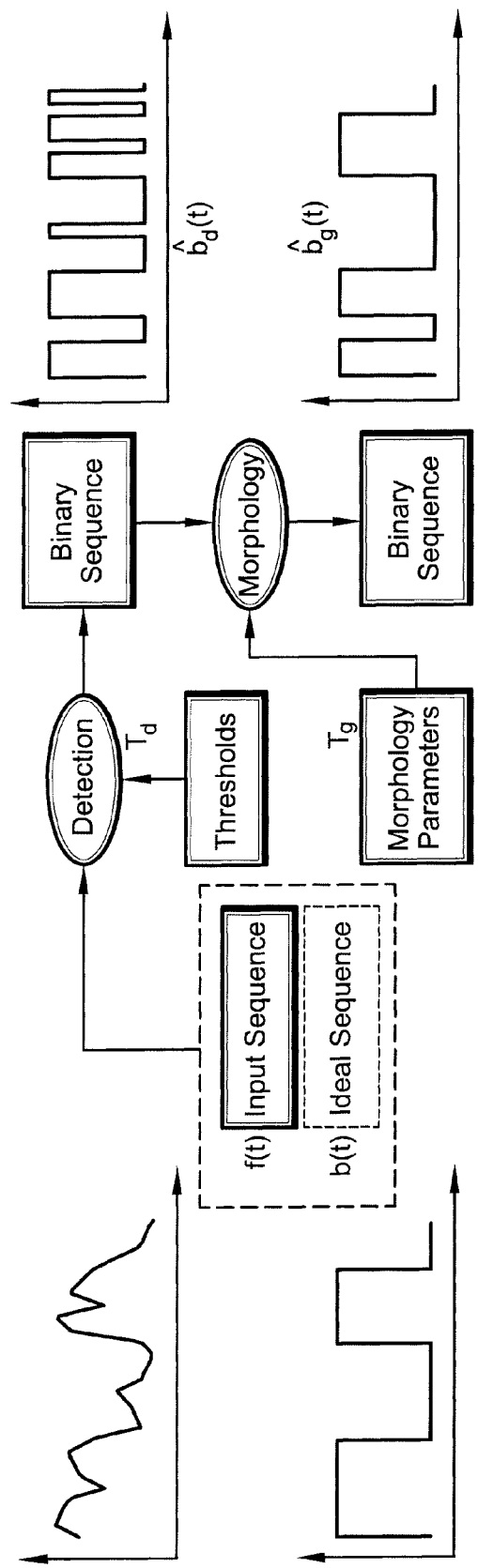
FIG. 1 is a block diagram illustrating a system flow of a pattern analysis system.

A system diagram for a typical pattern analysis system is illustrated in FIG. 1.

Let f(t) denote the mapping from the pixel index set {1, 2, ... N} to the gray level measurements R. Let b(t) denote the ideal unknown function representing the mapping that assigns the true labels (e.g., foreground/background (1/0)) for each index. The detection algorithm is viewed as a function that maps f(t) to the binary series $\hat{b}_d(t)$ by using a decision rule (that could be spatially varying). Define pf(t) as the conditional probability that the detector output $\hat{b}_d(t)=1$ given that the true label b(t)=0. Let pm(t) be the conditional probability that $\hat{b}_d(t)=0$ given b(t)=1.

A natural representation of the statistics $\hat{b}_d$ and $\hat{b}_g$ is the distribution of the run lengths as a function of the filter parameters used (e.g., structuring element sizes in a morphological operator). This representation is convenient in that it provides a natural way to interpret the results of morphological operations. The size distributions of shapes (granulometrics) have been used in the morphology literature to describe signal statistics. The derivation of the statistics of the run lengths may be viewed as a function of b(t), $\hat{b}_g(t)$, and the morphological operator parameter $T_g$. Let $\hat{C}_l$ denote the number of runs of length l in the output of the morphological algorithm. An objective is to derive the conditional distribution $p(\hat{C}_l; T_g, N | \{pm(t)\}, \{pf(t)\})$. Most research in theory of runs has addressed this problem by using combinatorial analysis. However, the prior art assumed stationary (i.e., pm(t)=pm and pf(t)=pf) while the present invention does not make any assumption about the form of pm(t) and pf(t).

Advantageously, the present invention uses a technique that embeds a discrete random variable into a finite Markov chain to numerically compute the probability mass function (pmf) of the discrete random variable. The pmf is essentially computed as a function of the N-step transition probabilities of the Embeddable Markov Chain (EMC). The main advantage of using this algorithm is that Monte-Carlo simulations are prohibitively slow when probabilities for unlikely events are being estimated.

For a given n, let $\Gamma_n = \{0, 1, \ldots, n\}$ be an index set and $\Omega = \{a_1, \ldots, a_m\}$ be a finite state space.

A nonnegative integer random variable $X_n$ can be embedded into a finite Markov chain if:

1. there exists a finite Markov chain $\{Y_t: t \in \Gamma_n\}$ defined on the finite state space $\Omega$.
2. there exists a finite partition $\{C_x, x=0, 1, \ldots, l\}$ on the state space $\Omega$.
3. for every x=0, 1, ..., l, we have $p(X_n=n)=p(Y_n \in C_x)$.

Let $\Lambda_t$ be the m×n transition probability matrix of the finite Markov chain $(\{Y_t: t \in \Gamma_n\}, \Omega)$. Let $U_r$ be a 1×m unit vector having 1 at the rth coordinate and 0 elsewhere, and let $U'_r$ be the transpose of $U_r$. Finally, for every $C_x$, define the 1×m vector $U(C_x) = \Sigma_{r:a_r \in C_x} U_r$.

If $X_n$ can be embedded into a finite Markov chain, then $$p(X_n = x) = \pi_0 \left( \prod_{t=1}^{n} \Lambda_t \right) U'(C_x)$$

where $\pi_0 = [p(Y_0=a_1), \ldots, p(Y_0=a_m)]$ is the initial probability of the Markov chain.

If the Markov chain is homogenous, that is $\Lambda_t = \Lambda$ for all $t \in \Gamma_n$, then $\forall_x = 0, \ldots, l$ the exact distribution of the random variable $X_n$ can be expressed by $p(X_n=x) = \pi_0 \Lambda^n U'(C_x)$.

In order to find the distribution of any embeddable random variable, one has to construct: (i) a proper state space $\Omega$, (ii) a proper partition $\{C_x\}$ for the state space. and (iii) the transition probability matrix $\Lambda_t$ associated with the EMC. The exact process by which the state space is defined along with the partitioning is dependent on the nature of the statistic of interest and the operator used.

Statistics Calculation Using EMC Approach

Before the problem of deriving the run length distributions in the output of a morphological algorithm is addressed, the EMC approach is described. This approach can be used to derive the run length distribution of the observation of an uncorrelated random binary series. Here, the problem of calculation of the joint run length distribution, i.e., "What is the probability of having m runs with size M and n runs with size N?" is addressed.

State Space Construction

Figure 2:
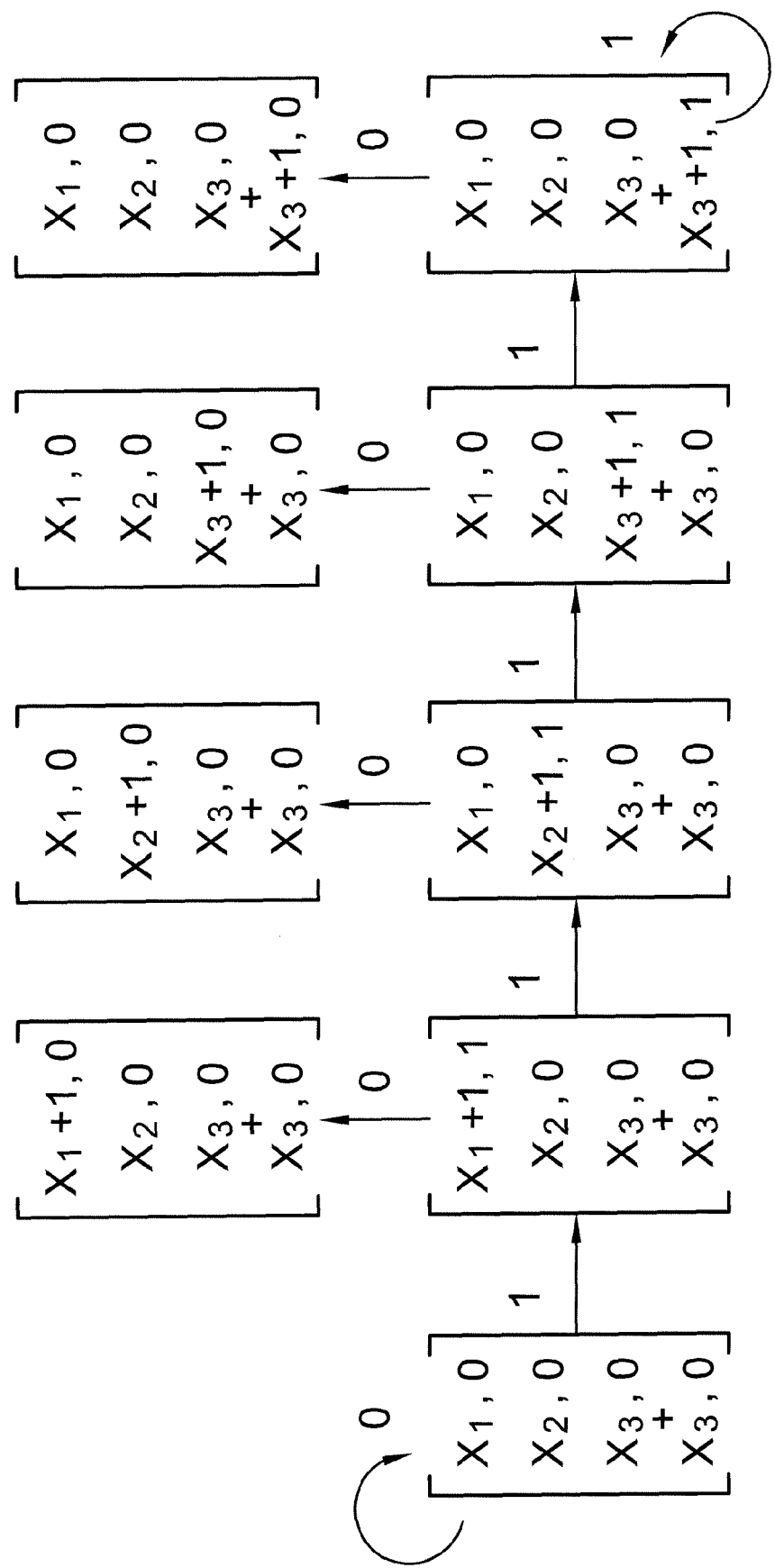
FIG. 2 shows an example of a run length statistics calculation.

The state space construction for the computation of the distribution of run lengths is rather straightforward. View the sequence of binary observations up to pixel T as partial observations of the 0 and 1 runs. A variable $x_i$ is needed to denote the number of observations of runs of a given length i at pixel T and an indicator variable $m_i$ to denote the situation whether the preceding number of ones is exactly equal to i or not. Thus $m_i$ takes on value 1 if the last sequence of 1s is exactly equal to length i and 0 otherwise. The pair (X,M), $X=[x_1, \ldots, x_n, x_n^+]$, $M=[m_1, \ldots, m_n, m_n^+]$ denotes the states for the problem. Here $x_n^+$ denotes the number of runs larger than n and $m_n^+$ in the corresponding indicator variable. Given these states it is easy to see that the graph shown in FIG. 2 constitutes the Markov chain for the run length statistics computation problem. In the graph, focus is on the joint distribution of run length whose size is equal to or less than 3. However, those skilled in the related art will appreciate that the graph shown in FIG. 2 can be extended to meet the requirement of the joint distribution of a longer run length.

The partition of the state space corresponds to the singleton sets of C with assigned count values. The values for the probabilities in $\Lambda_t$ are given by the following expressions. For example, the probability of observing a 0 at location t is given by the sum of two terms: the probability that the true value is 0 and there is no false alarm, and the probability that the true value is 1 and there is a misdetection.

$$q_t(0) = p_{b(t)}\{0\}(1-pf(t)) + p_{b(t)}\{1\}pm(t) \quad (1)$$

$$q_t(1) = p_{b(t)}\{0\}pf(t) + p_{b(t)}\{1\}(1-pm(t)) \quad (2)$$

where $p_{b(t)}\{\}$ is the distribution of the ground truth.

It is clear that a large state space is needed for calculating the joint distribution when n is large. For example, when n=50, more than $10^{24}$ states are needed, thus requiring a large memory for implementation.

Statistics for One-Dimensional Morphology

It was shown that run-length statistics for a binary random series can be derived before the application of the morphological algorithm. The statistics can be derived for an uncorrelated binary series or a correlated series defined in terms of a homogenous or inhomogeneous Markov chain. Now we will use the probability of observing a given number of runs of length greater than equal to $S$, $G_{n,S}$, after the closing operation with closing parameter $T_g = L$ as an example to illustrate how the output statistics of a morphological operator for binary series can be derived by using the EMCs. The trick again is to devise the appropriate EMC. Similar EMCs can be derived for openings, and openings followed by closings, etc.

To construct the state space we have to consider the property of the closing operation. Closing essentially fills gaps of sizes less than a given length L. At any given pixel the output $\hat{b}_g(t)$ is a 1 if and only if $\hat{b}_d(t)=1$ or $\hat{b}_d(t)=0$ and there exists two neighbors with indices t–i and t–j, i,j≧1, $\hat{b}_d(t-1)=1$ and $\hat{b}_d(t+j)=1$ with j+i<L. This implies that in addition to the number of runs of length greater than or equal to S, the state space has to include information about the run length of the last 1-run observed as well as the length of the last gap (if any 0-runs) to identify the partial state. One has to wait until the gap length is greater than L before deciding to terminate a previous run.

Figure 3:
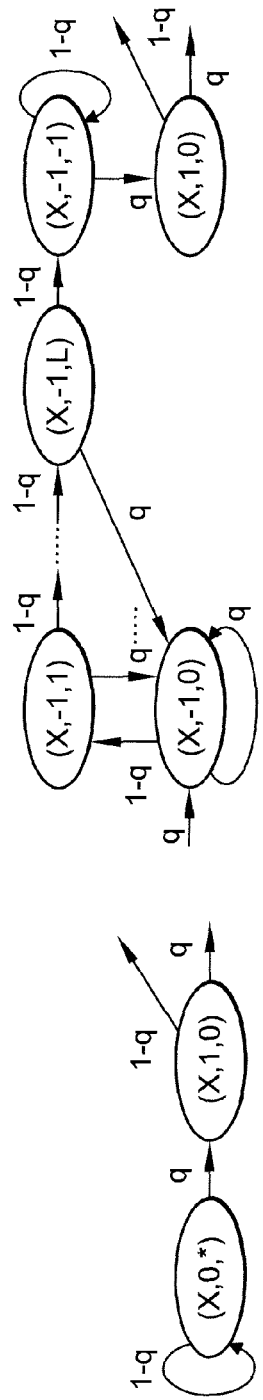
FIGS. 3-5 show examples of state transition diagrams illustrating the state transitions of a closing operator.
Figure 4:
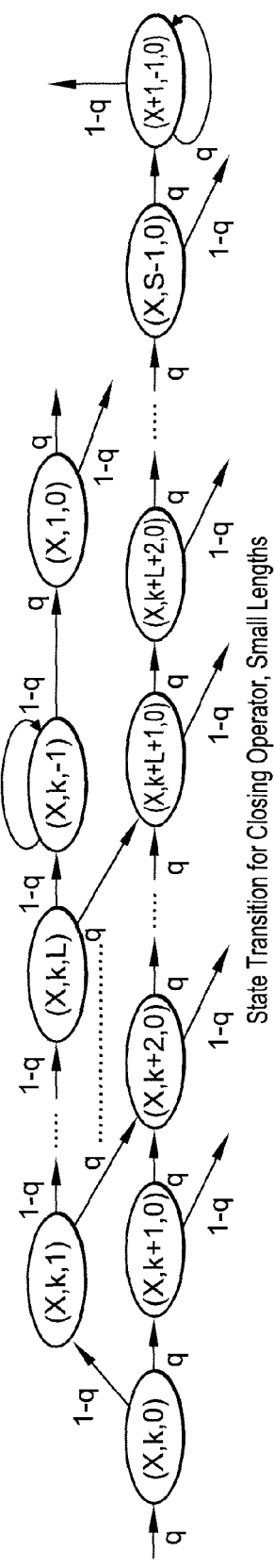
Figure 5:
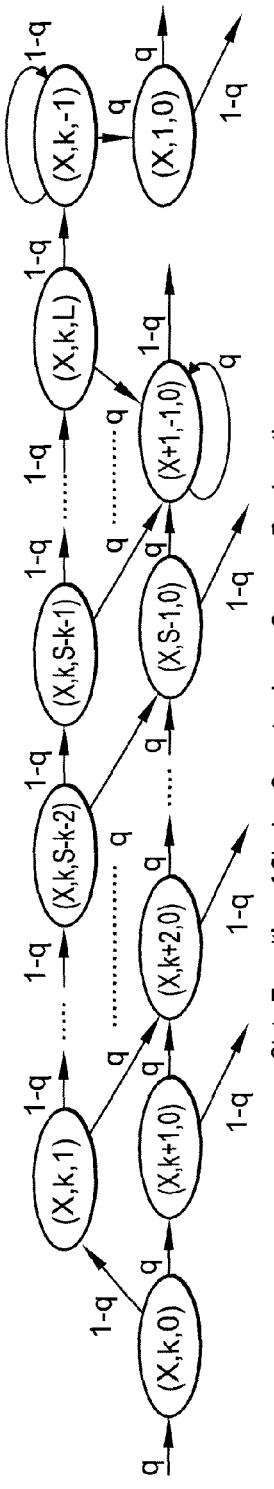

Formally, define the state variable to be (x,s,f) where $$x = 0, 1, \ldots, \left[\frac{n+1}{k+1}\right]$$

denotes the number of success runs of size greater than or equal to k, s=–1, 0, . . . , L is the number of failures in the last failure run, L is the size of the structuring element. The value –1 for f corresponds to a gap of length of greater than L that cannot be filled, while a value –1 for s corresponds to having a 1-run of length greater than or equal to S. The left graph of FIG. 3 corresponds to the initial condition for the state transitions. The right graph of FIG. 3 corresponds to the state transition diagram illustrating that the length of 1-run observed before the start of the transitions is already greater than or equal to S (i.e., the overflow condition). FIG. 4 corresponds to the elements of the state transition diagram for the case that the partial 1-runs observed have length k<S and k+L+1<S. FIG. 5 corresponds to the elements of the state transition diagram for the case that the partial 1-runs are such that the constraint k+L+1≧S is satisfied. Note that the diagrams are illustrative of only the portions of the large state transition diagram for the embeddable Markov chain. For illustrative purposes we present only the parts of the diagram that are the elements of the larger graph. The larger graph is the concatenation of those individual elements.

The partition of the state space is based on the number of success runs, x. The values of transition probabilities are given by the $q_t$ and $1-q_t$ where $$q_t = p_{b(t)}\{0\}pf(t) + p_{b(t)}\{1\}(1-pm(t)).$$

Statistics of Binary Series in Morphology Operator Output

The EMC approach is illustrated to show how it can be used to compute the probability distribution of the Hamming distance between the output closing operation and a ground truth signal perturbed by a stochastic process. After that, how one could derive similar statistics when multiple morphological operations are applied consecutively will be introduced.

Statistics for Closing Morphology Operator

The effect of the closing operator with parameter $T_g$ when applied to the detector output $\hat{b}_d(t)$ to produce $\hat{b}_g(t)$ is analyzed. The deviation of $\hat{b}_g(t)$ from the ideal signal b(t) is measured by the Hamming distance (the number of locations where the two Boolean series differ in value). Let X be a discrete random variable corresponding to the Hamming distance between the binary random series $\hat{b}_g(t)$ and the ground truth b(t). In this analysis, b(t) is assumed to be composed of independent (but not necessarily identically distributed) random variables or spatially correlated random variables where the correlation is described by a Markov model. $\hat{b}_d(t)$ is a perturbed version of b(t) where the perturbation model parameters are described by $p_f(t)$ and $p_m(t)$.

Statistical Independent Case Example

Let the input binary series consist of Boolean random variables that are statistically independent with the probability, of the t-th pixel being value 0, $q_t$. The EMC for calculation of the Hamming distance in this case is given below. The EMC for calculation of correlated binary sequences and the state transition diagram have been devised without providing details herein.

The State Space is:

$$\Omega = \{(x,p,q): x=0, \ldots, N; p=\omega, 0, \ldots, T_g; q=\omega, 0, \ldots, T_g\}.$$

The state variable in the left graph is (x,p,q), where x is the Hamming distance, p is the number of 0s in the trailing run of the observed sequence and q is the number of 0s in the ground truth binary series in this trailing run's domain. The value p is needed since it provides the partial gap length observed so far and if this gap were closed, one would have to use the value of q to update the Hamming distance. The notation p=ω is used for an overflowing state that corresponds to the condition that a given gap will not be filled by the closing operation.

The Partition is:

$$C_x = \{(x,p,q): p=\omega, 0, \ldots, T_g; q=\omega, 0, \ldots, T_g\}, x=0, \ldots, N.$$

The State Transition Probabilities are specified by the following equations.

When b(t)==1 and $\hat{b}_d(t)$==1, (correct detection):

$$p_t(x+2q-p,0,0;x,p,q)=1-q_t, p\neq\omega, q\neq\omega \ p_t(x,0,0;x,\omega,\omega)=1-q_t$$

When b(t)==0 and $\hat{b}_d(t)$==0, (correct rejection):

$$p_t(x,p+1,q+1;x,p,q)=1-q_t, p\neq\omega, q\neq\omega \ p_t(x,\omega,\omega;x,\omega,\omega)=1-q_t$$

When b(t)==0 and $\hat{b}_d(t)$==1, (false alarm error):

$$p_t(x+2q-p+1,0,0;x,p,q)=q_t, p\neq\omega, q\neq\omega \ p_t(x+1,0,0;x,\omega,\omega)=q_t$$

When b(t)==1 and $\hat{b}_d(t)$==0, (miss detection error):

$$p_t(x+1,p+1,q;x,p,q)=q_t, p\neq\omega, q\neq\omega \ p_t(x+1,\omega,\omega;x,\omega,\omega)=q_t$$

The interpretation of the above equations is as follows. View the value x as the partial Hamming distance between b(t) and $\hat{b}_g(t)$ until the current pixel instant t. If the closing operation given the current observation results in an alteration of the output $\hat{b}_g(t)$ then we have to alter our estimated Hamming distance to correspond to the correct value. The state jumps are essentially of two types:

1) States (2nd and 4th equations in the above set), where the Hamming distance values are continually updated (changing) given the current measurement at pixel t (since the decision concerning the effect of closing operation on the output cannot be made because we have observed only a partial sequence of 0s of length less than $T_g$), and 2) States (1$^{st}$ and 3$^{rd}$ equations in the above set), where the Hamming distance values take discrete jumps because of the switching of all the zero values in the trailing window to a 1 as a result of the closing operation.

For example, when correct detection occurs, there are two possible cases to be considered:

1) The last trail of 0s is of length smaller than or equal to $T_g$. In this case, the gap will be closed by the closing operation. This corresponds to a state jump from (x,p,q) to (x+2q−p,0,0). The term 2q−p is an update factor that increments the Hamming distance to take account the flipping of 0's to 1's after the closing operation.

2) The last trail of 0s is of length greater than $T_g$ and hence this gap cannot be closed. This corresponds to being the state (x,ω,ω). After state transition the new state is (x,0,0), i.e., no change is made to our estimate of the Hamming distance, but the p and q values are reset to zero.

Figure 6:
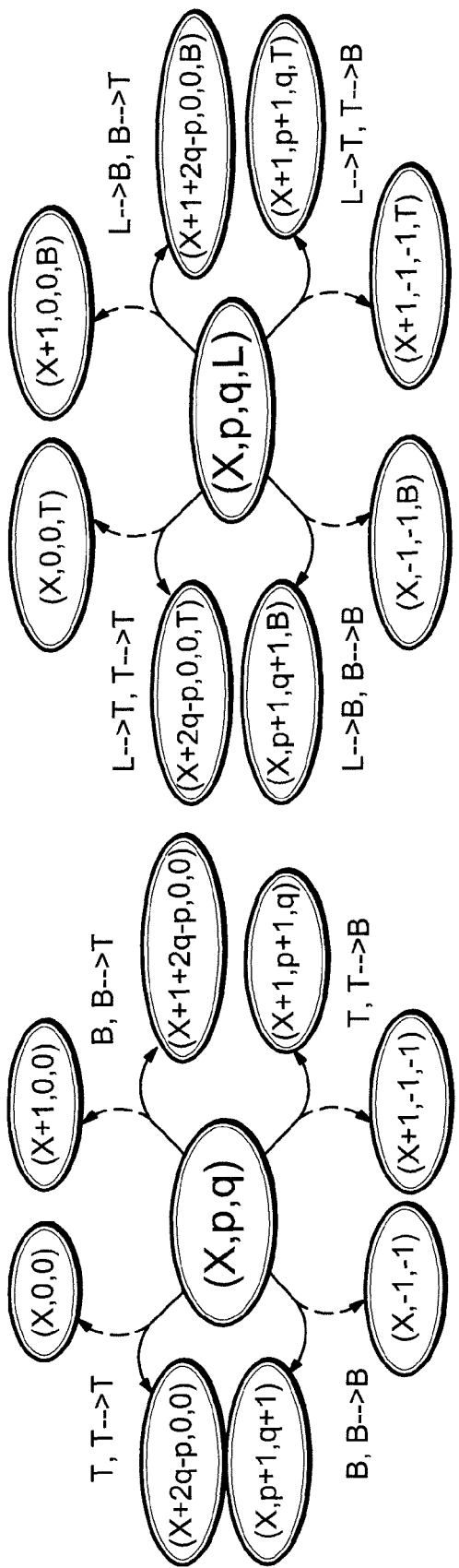
FIG. 6 shows an example of the state transitions for a Hamming distance calculation, after closing.

FIG. 6 shows the EMC model for calculating the Hamming distance after closing. The symbols with a right arrow in the figure represent events. The left graph corresponds to the case when input binary r.v.s. b(t) is statistically independent, and the right graph is the case when the background model b(t) has the first order Markov property. Because the right graph assumes the Markov property, an additional variable, L, is added to the state variable. It shows the previous ground truth.

In FIG. 6, the dashed lines show four special cases and the solid lines indicate closing operation case. The upper dashed lines correspond to state transitions when the length of the trailing 0-run is longer than the closing parameter and the operator gets a 1. The lower dashed lines correspond to the state jumps to an overflow state (p=ω), when the trailing 0-run length is above $T_g$ and the operator gets a 0. The lower solid lines correspond to state jumps as described below. When there is a correct rejection, p and q will be increased by 1. When there is a miss detection error, not only p is increased, but also x is increased because of one more error introduced (however, q will not be increased). The upper solid lines need more explanation. According to the definition, p−q, 0 errors in the trailing run become correct labelings, and at the same time, q correct 0's will become error labelings after the closing operation. When there is a correct detection (the closing operation is applied in this case), 2q−p errors are made. When there is a false alarm error, 2q−p+1 errors are made. The difference between these is due to the current false alarm error. From FIG. 6, it is clear that the state variable is not only a function of the operation used, but also a function of the input statistics. The independent observation assumption can reduce the complexity of the graph and computation requirements.

Statistical Markov Case Example

The right graph in FIG. 6 shows the EMC model for calculating the Hamming distance after closing when the background model b(t) has the first order Markov property. Note the use of an additional variable, L, in the state variable. It is needed to keep track of the previous state (i.e., the ground truth) value at t−1. Details of the state transition probability equations are omitted due to lack of space.

Statistics for Close-Open Operator Sequences

Previously, a method was introduced to calculate the Hamming distance distribution after a morphological closing by using the EMC approach. Next, it will be shown how to generalize the EMC approach to get the statistics of close-open or open-close operator sequences. The main idea is to use more state variables to save all the temporary information and to extend the graph from a single layer representation to a multi-layered graph.

As one example to show how to generate the state space and transition probabilities matrix for the EMC when given an operator sequence, the Hamming distance after the closing-opening operator sequence-closing with parameter $K_1$, opening with parameter $K_2$, will be used. To simplify the description, the term "operator $K_1$" is used to indicate the closing operator with closing parameter $K_1$ and the "operator $K_2$" to indicate the opening operator with opening parameter $K_2$.

State Space Construction

View the sequence of binary observations up to a pixel instant T as partial observations of 0 and 1 runs. x is used to denote the Hamming distance and the state variable is (x,$p_2$, $p_2^a$,$q_1$,$q_1^a$). The components with the superscript a indicate how many correct detections in the corresponding numbers without the superscript. $q_1$ is the number of 0's in the last 0-run and $q_1^a$ is the number of 0's which are correct 0's in the last 0-run. $p_2$ is the number of 1's in the last 1-run and $p_2^a$ is the number of 1's which are correct 1's in the last 1-run. It is clear that there are $q_1-q_1^a$ errors in the last 0-run and $p_2-p_2^a$ errors in the last on run. Then if the closing operator is applied to $q_1$, those $q_1^a$ correct 0's in the last 0-run will become errors in the last 1-run. Those $q_1-q_1^a$ errors in the last 0-run will become correct 1's. Thus, the Hamming distance should be adjusted by $q_1^a-(q_1-q_1^a)$ Similar changes happen to the other component when the opening operator is applied.

Definition of State Transition Probabilities $\Lambda_t$: In the Hamming distance calculation, the events are:

| | |
|---|---|
| $I_{0,0}$ correct rejection | $I_{0,1}$ false alarm error |
| $I_{1,0}$ miss detection error | $I_{1,1}$ correct detection |

When the event is $I_{0,0}$, the state (x,$p_2$,$p_2^a$,$q_1$,$q_1^a$) moves to the state (x,$p_2$,$p_2^a$,$q_1$+1,$q_1^a$+1). When the event is $I_{1,0}$, the state (x,$p_2$,$p_2^a$,$q_1$,$q_1^a$) moves to the state (x+1,$p_2$,$p_2^a$,$q_1$+1,$q_1^a$).

Since the first operator in the operator sequence is a closing operator, no comparisons or judgments are necessary when the system gets a 0 (event $I_{0,0}$ or $I_{1,0}$). When the event is $I_{0,1}$ or $I_{1,1}$, operator effects need to be considered. Since the only differences between $I_{0,1}$ and $I_{1,1}$ are that $I_{0,1}$ will increase the Hamming distance by 1 and reduce the correct 1's in $p_2^a$ by 1, the event $I_{1,1}$ is used to show state evolution. One of ordinary skill in the related art would be able to easily derive the states for event $I_{0,1}$. Suppose the event is $I_{1,1}$. If $q_1 \leq K_1$, the operator will close the last 0-run, then the state (x,$p_2$,$p_2^a$,$q_1$,$q_1^a$) will move to the state (x+2$q_1^a$−$q_1$,$p_2$+$q_1$+1,$p_2^a$+$q_1$−$q_1^a$+1,0,0). If $q_1 > K_1$, the closing operator will have no impact to the sequence, and will have no impact to the state variable. Then, the operator $K_2$ must be considered. If ($q_1 > K_1$)&&($p_2 \leq K_2$), the opening will take place, the state (x,$p_2$,$p_2^a$,$q_1$,$q_1^a$) will move to the state (x−$p_2$+2$p_2^a$,1,1,0,0). If ($q_1 > K_1$)&&($p_2 > K_2$), the morphology operator sequence will have no effect. The state (x,$p_2$,$p_2^a$,$q_1$,$q_1^a$) will move to the state (x,1,1,0,0).

Application

Numerous applications of the present invention can be realized, including pattern analysis or classification tasks, e.g., document processing, text analysis from video, machine vision. The following describes the use of the present invention in conjunction with license plate detection as one example to show how the present invention may be applied.

Hidden Markov Models (HMMs) have been extensively used in the document understanding literature for text extraction. In this example application, license plate and background binary pattern distributions are modeled as mixtures of HMMs. The main point is that while one way to implement the binary series classification might be by direct implementation of a mixture of HMM-based classifiers, a morphological operator sequence with associated parameters serves as an approximation to the classification mechanism. Denote the HMM parameters for the background binary series and license plate binary series as $\Theta_B$ and $\Theta_L$ respectively. The objective is to obtain the mapping from the $(\Theta_{B,\Theta L})$ to a morphological operator sequence and its parameters $(O_S, \Theta_S)$. The major gain is in the computational performance as well as providing strong statistical justification for use of a morphological algorithm with associated parameters for the task.

In the application, pixels on the license plate are assumed to be 1s while non-plate pixels are assumed to be 0s. As before we use notations: ideal signal b(t), the detection result $\hat{b}_d(t)$, and the grouping result $\hat{b}_g(t)$, etc. The Hamming distance between b(t) and $\hat{b}_g(t)$ is used as the criterion function to evaluate the performance of the morphological sequence. Ideally, all the plate pixels should be detected and all of the non-plate pixels should be ignored. There are two types of errors. The type one error is the false alarm error, i.e., labeling the non-plate pixel (0) as a plate pixel (1), the type two error is the miss detection error, i.e., labeling a plate pixel (1) as a non-plate pixel (0). For example, in the binary images shown in FIGS. 7(a)-(f), all the black pixels in the non-plate region are the false alarm errors and all the white pixels in the plate region are the miss detection errors in the input of morphology operator.

Figure 7:
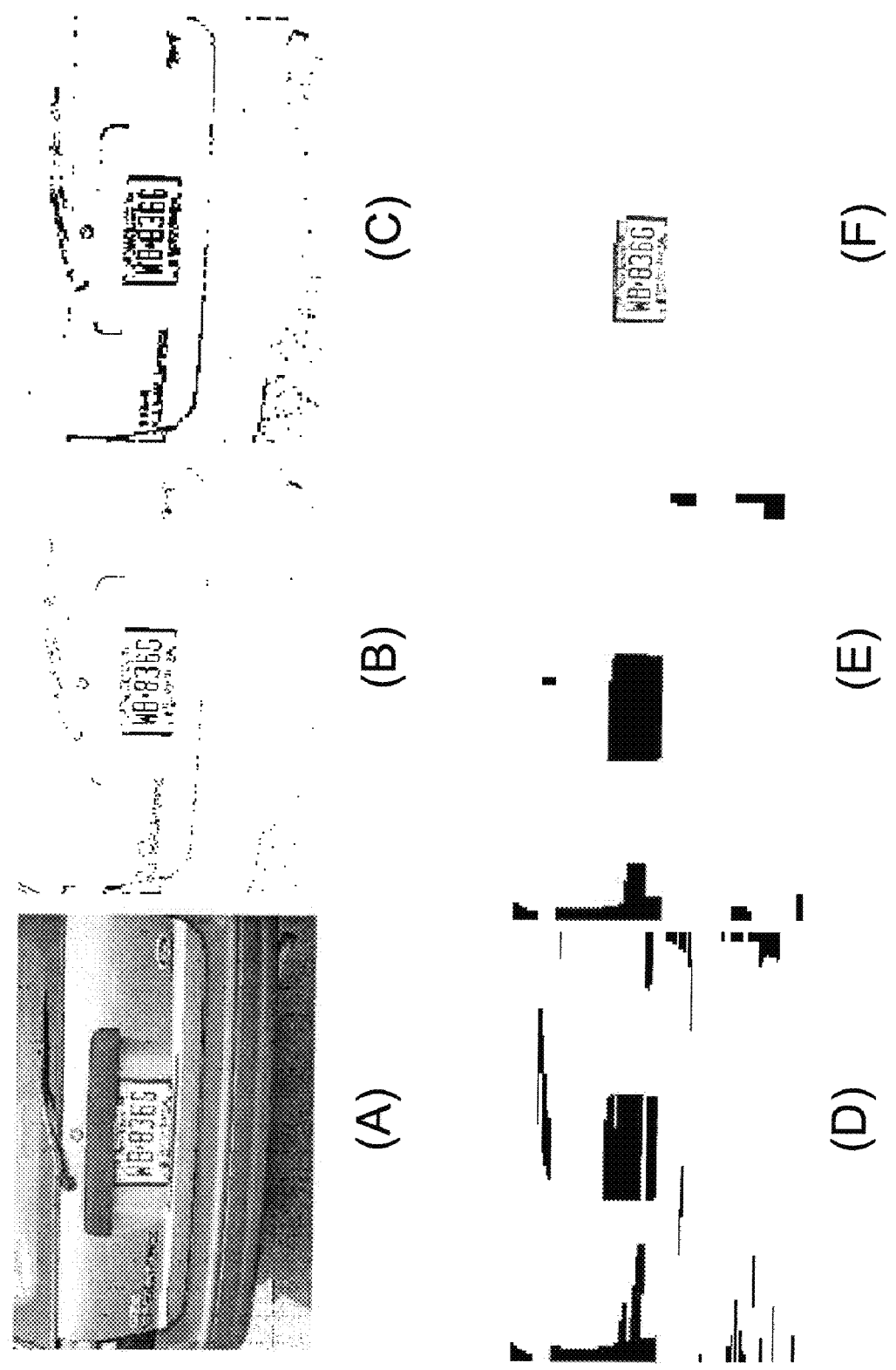
FIGS. 7-8 show the results of license plate detection processing according to an embodiment of the present invention.

The license plate detection algorithm is comprised of the following steps. Initially, the image is inputted (FIG. 7a), and thresholded using an adaptive mechanism (FIG. 7b), downsampled (FIG. 7c), and text areas are classified by applying open-close operations in the horizontal direction (FIG. 7d) followed by close-open operations in the vertical direction (FIG. 7e). The objective is to determine the parameters of the horizontal morphology operator sequence $(\Theta_h)$, and the vertical morphology operator sequence $(\Theta_v)$ that minimizes the probability of misclassification P(Plate; $\Theta_h, \Theta_v$|truth=NonPlate)+P(NonPlate; $\Theta_h, \theta_v$|truth=Plate). The parameter optimization algorithm consists of the steps:

Fix the parameters of the adaptive-thresholding step (e.g., window size, percentage threshold).

Choose a training set of images, apply adaptive thresholding and consider samples of binary series in the background and in the plate region. Estimate HMM model parameters for the binary series in background and plate region for each image. The distribution of binary patterns in the background and foreground for the collection of images are then approximated by a mixture of HMMs.

Given the centroid of these HMM model parameter clusters, an EMC approach can be used to compute the probability of error for various morphological operator parameter combinations.

The operator sequence and parameters that minimize the weighted sum of the probability of false alarm and misdetection is considered to be the best operator. According to the requirements of real applications, different weighting can be applied to the false alarm and miss detection probabilities.

Experimentally, 60 license plate images were initially supplied. From the 60 license plates images, 50 images were randomly chosen as the training set and 10 images as the testing set. The size of the images were 768×512 and the size of the plate in the images was usually 135 pixels wide and 65 pixels high. Transition probabilities of the Markov model for the original size image were estimated. From the Markov property and the description of how the EMC approach works, it is apparent that if the morphology parameters for the original size image is calculated, the state space will be prohibitively large leading to high computational cost. Instead, the system was configured to downsample by a factor of 4 and use it as the output of detection stage (and also input for the morphology stage). Although downsampling increases the false alarm rate in the non-plate region and decreases the miss detection rate in the plate region, the main objective was just to illustrate the utility of EMC for this application.

Figure 8:
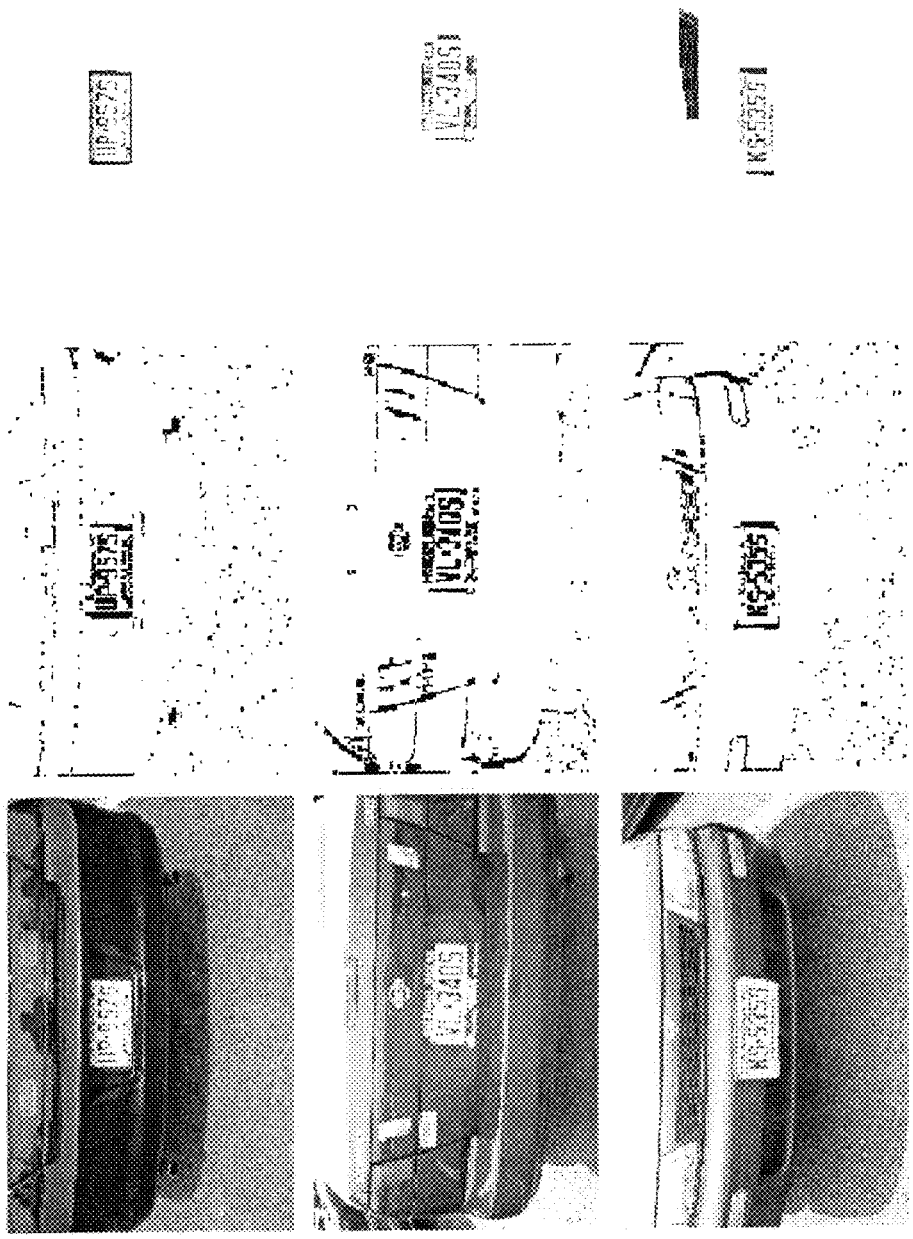

From various experiments, it was concluded that the "optimum" morphological operator sequence for the horizontal direction was an open-close sequence with parameters 11 and 19 respectively. For the vertical direction, we found that the best operator sequence was a close-open sequence with parameters 2 and 5 respectively. FIG. 8 shows results of the test set of images obtained by using the chosen morphological operator sequence.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for automated selection of a parameterized operator sequence to generate a pattern classification task, comprising the steps of:
   inputting a collection of labeled data patterns,
   wherein the labeled data patterns include images labeled as an object of interest and a background of the object of interest;
   deriving statistical descriptions of the inputted labeled data patterns, wherein the statistical descriptions include Hidden Markov Model parameters;
   determining classifier performance for each of a plurality of candidate operator sequences and corresponding parameter values, using the derived statistical descriptions;
   identifying an optimal classifier performance among the determined classifier performances based on probabilities computed by an Embedded Markov Model Chain; and
   selecting the operator sequence and corresponding parameter values, associated with the identified optimal classifier performance,
   wherein the method is performed by a processor.

2. The method of claim 1, further including the step of outputting performance metric information.

3. The method of claim 2, wherein the outputted performance metric information includes the selected operator sequence and corresponding parameter values.

4. The method of claim 1, wherein the plurality of operator sequences includes default operator sequences.

5. The method of claim 1, wherein the plurality of operator sequences includes operator sequences defined by a user.

6. The method of claim 1, wherein the identifying is based on a maximum expected classifier performance.

7. The method of claim 6, wherein the maximum expected classifier performance relates to balancing the tradeoff between false alarm errors and miss detection errors.

8. The method of claim 1, wherein the plurality of operator sequences includes at least one of erosion, dilation, closing, opening, close-open, and open-close.

9. The method of claim 1, wherein the plurality of operator sequences includes an operator that maps an input Boolean vector to an output Boolean vector.

10. The method of claim 1, wherein the plurality of operator sequences includes an operator that is defined as a successive application of a 1D filter in two orthogonal directions.

11. The method of claim 1, wherein the inputted collection of data patterns includes gray-level data transformed to a binary representation.

12. The method of claim 1, wherein the inputted collection of data patterns includes color data transformed to a binary representation.

13. A non-transitory computer-readable medium readable by a machine, tangibly embodying a program of instructions executable on the machine to perform method steps for automated selection of a parameterized operator sequence to generate a pattern classification task, the method steps comprising:

inputting a collection of labeled data patterns, wherein the labeled data patterns include images labeled as an object of interest and a background of the object of interest;

deriving statistical descriptions of the inputted labeled data patterns, wherein the statistical descriptions include Hidden Markov Model parameters;

determining classifier performance for each of a plurality of candidate operator sequences and corresponding parameter values, using the derived statistical descriptions;

identifying an optimal classifier performance among the determined classifier performances based on probabilities computed by an Embedded Markov Model Chain; and selecting the operator sequence and corresponding parameter values, associated with the identified optimal classifier performance, wherein the method is performed by a processor.

* * * * *